May 28, 1935.  A. M. TROGNER  2,002,555
PROTECTIVE SYSTEM
Filed June 4, 1932  2 Sheets-Sheet 1
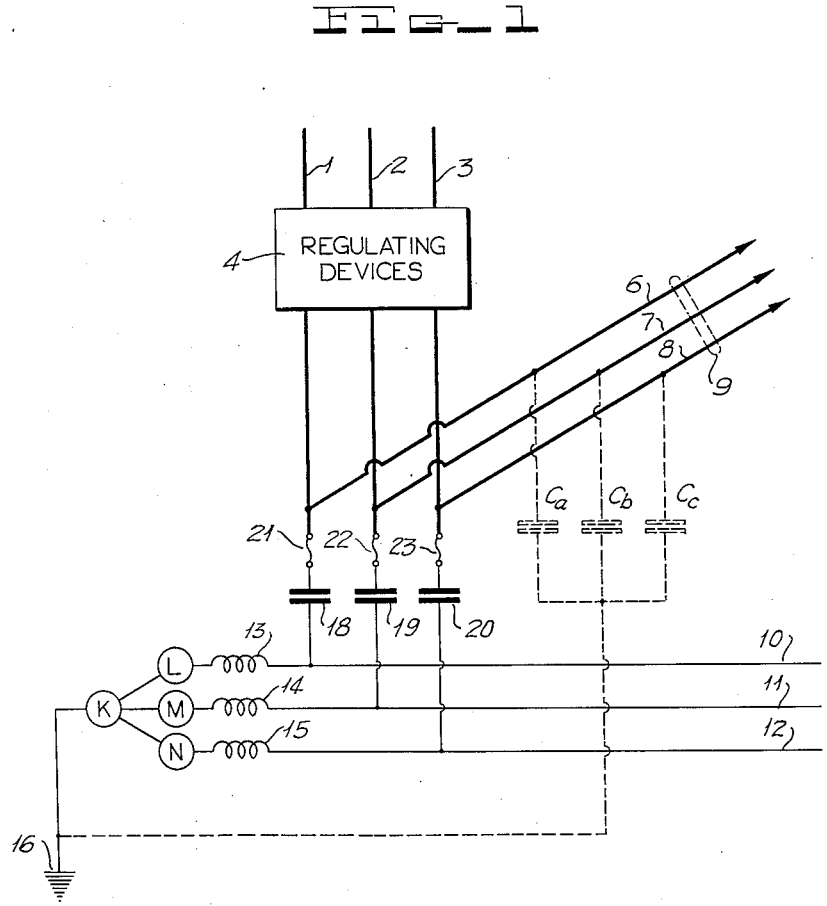
INVENTOR
Arthur M. Trogner

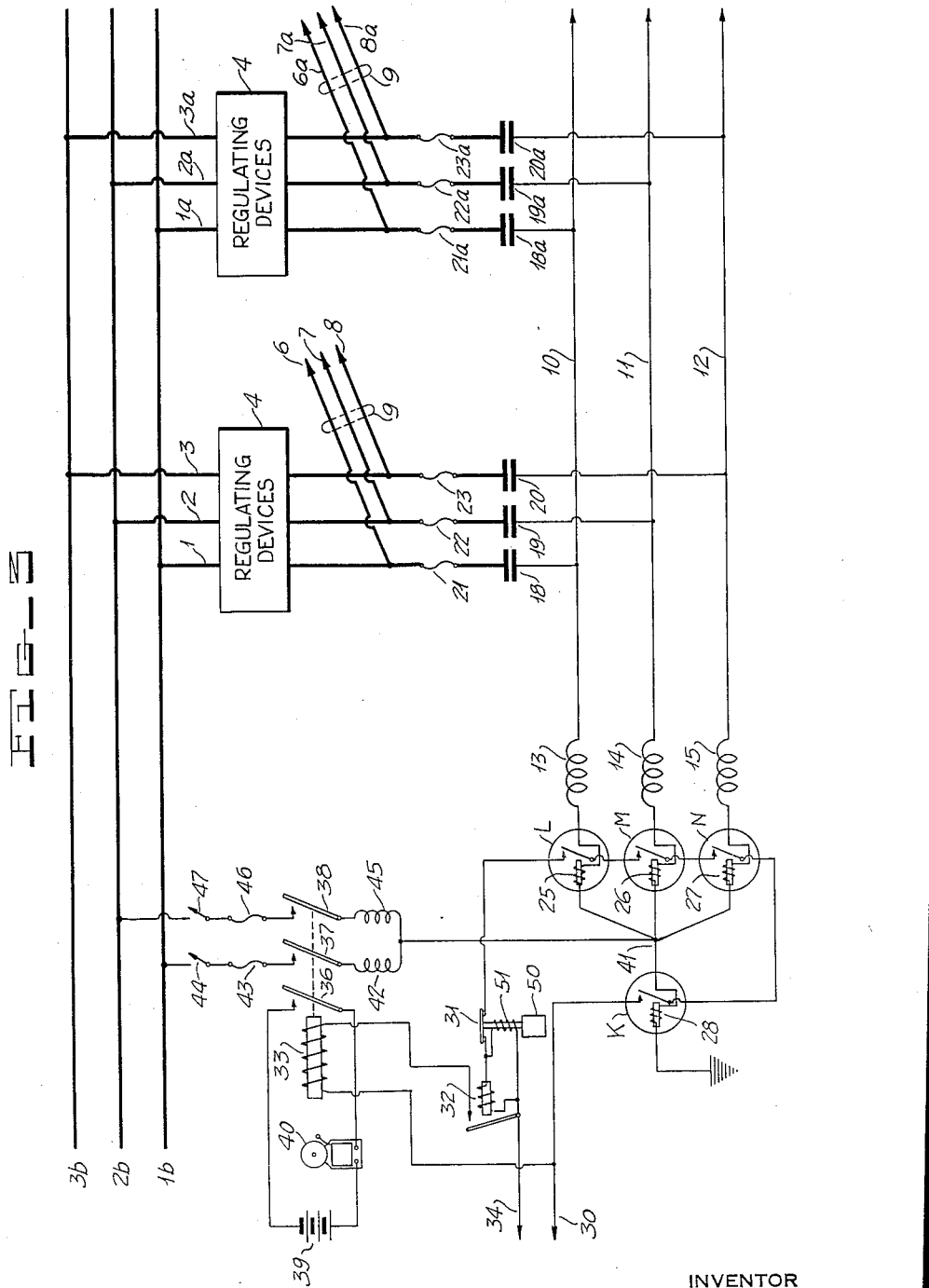

Patented May 28, 1935

2,002,555

UNITED STATES PATENT OFFICE 2,002,555

PROTECTIVE SYSTEM

Arthur M. Trogner, Maplewood, N. J., assignor to Wired Radio, Inc., New York, N. Y., a corporation of Delaware Application June 4, 1932, Serial No. 615,365

7 Claims. (Cl. 179—2.5)

My invention pertains in general to power distribution systems particularly of the multi-phase alternating current type associated with carrier frequency energy transmission means for program distribution purposes.

In wired radio broadcasting over three-phase power lines the carrier frequency energy is impressed upon the power feeders through coupling condensers designed to present a high impedance to the commercial alternating current but a comparatively low impedance to the high frequency carrier energy. Such condensers are connected in series with protective fuses. The power distribution system may be of the ungrounded delta type, the feeders being enclosed in a cable sheath for distribution of the three-phase commercial alternating current to various districts. In such a system it may occur that one of the coupling condensers will become shorted. It is then expected that the protective fuse will be blown provided that the fault or short-circuiting current is sufficiently large. Very often, however, the fault current is not of sufficient magnitude to blow the protective fuse connected with the faulty condenser, which results in the faulty condenser remaining in the line and not being disconnected. My invention is directed to providing means for alleviating such conditions and assuring the proper protection of the line in the event of coupler element failure or short-circuiting.

One of the objects of my invention consists in providing a protective system for causing the positive operation of current limiting devices in the event of faults or short-circuits in a system for the conjoint distribution of commercial power and carrier frequency energy.

A further object consists in producing a protective system for a carrier current-commercial power coupling organization having alarm means for indicating circuit faults.

I accomplish these and other desirable objects in a protective system for automatically causing increased voltages to be applied to protective fuses in lines in which faults occur.

In the drawings which accompany and form a part of this specification and in which like reference numerals designate corresponding parts throughout:

Fig. 1 is a schematic representation of circuits and apparatus in accordance with the principles of my invention;

Fig. 2 is a representation of capacitive conditions prevailing in a power feeder cable; and Fig. 3 is a diagrammatic representation of the electrical organization of one embodiment of the protective system of my invention.

Referring to the drawings and particularly to Fig. 1, lines 1, 2 and 3 are connected from a source of three-phase commercial power to the regulating devices generally indicated at 4 and thence to the power feeders 6, 7, and 8. The feeders 6, 7, and 8 are enclosed in a cable 9, and distribute commercial power as well as carrier frequency energy to various districts of the power distribution network. Each of the lines 1, 2 and 3 and the respective feeders 6, 7, and 8 correspond to the three phases of the three-phase commercial alternating current supply.

Lines 10, 11 and 12 are connected with a source of program modulated three-phase carrier frequency energy and correspond to the three different phases of the carrier frequency supply. The lines 10, 11 and 12 terminate in "drain" coils 13, 14 and 15 having a common connection to ground 16. The drain coils 13, 14 and 15 are designed to offer a substantially high impedance to the carrier frequency currents but comparatively low impedance to commercial alternating currents. The line 10 is connected through a coupling condenser 18 and protective fuse 21 to feeder 6. The line 11 is connected through coupling condenser 19 and fuse 22 to feeder 7, while the line 12 is connected through condenser 20 and fuse 23 to feeder 8. As before stated, these coupling condensers offer a high impedance to commercial alternating current but a comparatively low impedance to carrier frequency current. The feeder conductors 6, 7, and 8 each have a definite capacity to ground represented by the grounded sheath of cable 9. The capacitances between the conductors and the cable sheath are represented as $C_a$, $C_b$, and $C_c$ (see Fig. 2). The coupling condensers 18, 19, and 20 are in effect a second set of capacitances to ground in parallel with the capacitances just mentioned.

For purposes of explanation it will be assumed that there are current meters inserted in the lines 10, 11 and 12 at the points L, M and N, respectively, and another meter at the point K. Since the system is symmetrical, there will always be current flowing through a particular condenser, such as through the condenser 18, the current flowing therethrough being the vector sum of the current through the condensers 19 and 20 and the current flowing through $C_a$ which will be the vector sum of the current through $C_b$ and $C_c$, there being no ground current between these two groups. Under such conditions, meters at points L, M, and N will read the current flow through the respective condensers, but the meter at point K will read zero, or no current flow, when the system is functioning in a normal manner. If, for example, the condenser 18 should fail and short-circuit, the meter at point L would show an increased current which would be the vector sum of the increased current through the condensers 19 and 20 (due to the shorting of the impedance of condenser 18) plus the current which would then flow through meter at point K to ground and back to the feeders through capacitances C_b and C_c. Under such conditions all four meters would have current flowing through them. If, instead of one of the condensers, such as condenser 18, having failed, the feeder of the corresponding phase, such as feeder 6, happened to be grounded at a point outside of the substation, a condition would prevail in which substantially no current would flow through the meter L. This condition would be due to the fact that the impedance of the path from the faulty feeder to ground through the cable would be so low as compared with the impedance of the path through the corresponding coupling condenser that there would be no voltage impressed across that condenser. However, the meters at the points K, M, and N would indicate current flow.

Fig. 3 represents how I carry out the construction of one embodiment of my invention in accordance with the principles outlined in connection with Fig. 1. Referring to Fig. 3 the lines 1–3 are connected across busses 1b–3b, respectively, the busses 1b–3b being connected with the three-phase commercial alternating current supply in a substantion. Relays 25–27 are inserted at the points L, M, and N, respectively, while a relay 28 is inserted at the point K. All these relays are adapted to complete their respective circuits upon energization of their operating electromagnets. The relay 28, however, is designed to be slightly retarded in its operation in order to complete its respective circuit a moment later than the completion of circuits by the relays 25–27. A line 30 connected to a source of operating energy is directed through all of the relays 28, 27, 26, and 25, in series order, and thence through a timing relay 31 and the electromagnet of relay 32 to line 34, completing the circuit to the source of operating energy. The relay 31 is controlled by a coil 51 connected in parallel with the electromagnet of relay 32 and is equipped with a dash-pot 50. This relay 31 is of the type which, due to the dash-pot 50, will cause the interruption of the circuit connected therethrough at a predetermined time interval after the initial energization of the coil 51. It will be understood of course that all of the relays shown in Fig. 3 are equipped with springs for causing the return of their respective contactors to non-contacting positions when their respective coils or electromagnets are deenergized.

The electromagnets of relays 25–27 are connected on one side in series with the lines 10–12, respectively, and on the other side with a common junction 41 leading to the electromagnet of relay 28 and thence to ground. It will be seen that current flowing through the electromagnets of all of the relays 25–28 will complete a circuit from line 30 through relay 31 for causing the energization of the electromagnet associated with relay 32. Relay 32 controls a circuit to an electromagnet 33 which actuates the contactors 36–38 for causing completion of circuits when the electromagnet is energized. Contactor 36 controls a circuit from battery 39 to an alarm in the form of a bell 40. The contactor 37 completes a circuit from a reactance coil 42 through fuse 43 and switch 44 to bus 1b, while the contactor 38 completes a circuit from reactance coil 45 to fuse 46 and thence through switch 47 to bus 2b. The reactance coils 42 and 45 have a common connection to the junction 41. The reactance coils 42 and 45 are designed to permit large voltages to be supplied from the busses 1b and 2b but to prevent excessive current flow. The switches 44 and 47 are manually operated and provided to permit the safe removal of fuses 43 and 46 when desired, as well as inspection and adjustment of other apparatus. It will be understood that these switches 44 and 47 are normally closed in the operation of my system.

In the operation of my protective system the busses 1b–3b supply three-phase commercial alternating current through regulating devices 4 to feeders 6–8. The lines 10–12 supply program molulated three-phase carrier frequency energy to the feeders 6–8, through coupling condensers 18–20 and fuses 21–23, respectively. Under normal conditions, there will be current flowing through the electromagnets of relays 25–27 but no current flowing through the electromagnet of relay 28. Should one of the coupling condensers 18–20 fail by short-circuiting, current will flow through the electromagnets of all of the relays 25–28, in accordance with the principles outlined in connection with Fig. 1, thereby completing a circuit through relay 31 to energize the electromagnet of relay 32. Closing of relay 32 will cause the energization of coil 33 whereby the contactors 36–38 will be closed. The closing of contactor 36 will energize the alarm bell 40 while the closing of contactors 37 and 38 will apply a high voltage from the busses 1b and 2b to the juncture 41 and thence through the short-circuited or faulty condenser, such as condenser 18, to the corresponding fuse, such as fuse 21, which will be immediately blown and the faulty line thus cleared from the program feeder lines. It will, of course, be obvious that the voltage applied from the busses 1b and 2b does not affect the fuses which are in series with condensers in good condition.

When the electromagnet of relay 32 is energized, the coil 51 of relay 31 will also be energized. This energization of coil 51 in association with the action of dash-pot 50 will cause the relay 31 to open thereby breaking the circuit from relay 25 to relay 32. Opening of the contacts of relay 32 will cause the deenergization of electromagnet 33 whereby the contactors 36–38 will be opened. When the fuse in series with the faulty condenser has been blown, a condition of unbalance will still exist and current will flow through relay 28 but the current through this relay, owing to the opening of the line through the blowing of the fuse, will be insufficient to cause the operation of relay 28. Deenergization of coil 51 will cause relay 31 to again be closed, in preparation for another line-clearing operation. In the event that, for some reason, the faulty condenser should not be cleared, the circuit through relays 25–28 will remain completed due to the current flow conditions through all of these relays. When the relay 31 returns to a closed position the coil 51 will now be energized since the energizing circuit thereto is still completed and the relay 32 will again be closed and the electromagnet 33 will again be energized, thereby closing contactors 36–38 in a repeat operation. In this repeat operation, the alarm 40 will again sound and the high voltage from busses 1b and 2b will again be applied to the fuse associated with the short-circuited coupling condenser. If this operation is continually repeated without success in clearing the light, the substation attendant's attention will be drawn by the repeated sounding of the alarm 40 whereby steps may be taken to manually correct the fault which in some instances may not be susceptible to automatic correction. In any event, the ringing of the alarm 40, even in one line-clearing operation, will serve to notify the substation attendant that a fuse has been blown due to a faulty condenser, and requires replacement at a convenient time with respect to power and program distribution.

In the event that a short should occur due to the grounding of one of the feeders remote from the substation, the particular one of the relays 25–27 associated with the faulty feeder line would receive substantially no current, as explained in connection with Fig. 1, thereby preventing the completion of the circuit to relay 32 and avoiding operation of the contactors 36–28 for a line-clearing operation. It will be evident, therefore, that my protective system is selective in operation being only responsive to faults within the substation and not responsive to faults occurring remote from the substation on the feeder lines. Although I have shown a preferred embodiment of my protective system it will of course be understood that many changes can be made therein without departing from the intended scope of my invention. I do not therefore desire to be limited thereto except insofar as may be pointed out in the appended claims.

What I claim as new and desire to secure by Letters Patent of the United States is:

1. A protective system for insuring the operation of current limiting devices comprising in combination, a multi-conductor commercial current transmission system, a multi-conductor carrier frequency energy supply system the conductors of which correspond to the conductors of said commercial current transmission system respectively, a coupling device and fuse in series therewith connected between each of the corresponding conductors of said transmission system and said supply system, said fuse and said coupling device being connected to carry normal full load current therethrough, means responsive to faults in said transmission system and means controlled by said fault responsive means for increasing above normal the current flow through the conductor wherein a fault occurs to cause the operation of such fuse to disconnect the corresponding supply system conductor from the transmission system conductor in fault.

2. In a protective system for insuring the operation of current limiting fuse devices, a multi-conductor commercial alternating current transmission system, a multi-conductor carrier frequency energy supply system, the conductors of which correspond to the conductors of said commercial alternating current transmission system, respectively, a coupling device and fuse in series therewith connected between each of the corresponding conductors of said transmission system and said supply system, said fuses being connected to carry normal full load current therethrough, means automatically responsive to faults in different ones of said transmission system conductors and means controlled by said fault responsive means for increasing the current flow to the conductor in which said fault occurs to a magnitude sufficiently above normal to effect the operation of the fuse connected between such conductor and the corresponding conductor of said energy supply system.

3. A protective system comprising the combination with a multi-phase commercial alternating current transmission system including a number of different phase lines, a multi-phase carrier frequency energy supply system including a plurality of phase lines corresponding to the phase lines of said commercial alternating current transmission system, and a coupling device and current limiting device in series therewith connected between each of the corresponding phase lines of said transmission system and said supply system, of a group of relays each of which includes an operating electromagnet connected in one of the phase lines of said supply system, a separate relay having an operating electromagnet common to all of said phase lines of said supply system, a circuit from at least two phase lines of said transmission system to all of the phase lines of said supply system for directing commercial alternating current thereto, and an electromagnetically operated contactor for controlling said circuit, said contactor being operated under the collective control of said group of relays and said separate relay when short-circuiting of said coupling device in any of said phase lines occurs.

4. A protective system comprising the combination with a commercial multi-phase alternating current transmission system including a number of different phase lines, a multi-phase carrier frequency supply system including a plurality of phase lines corresponding to the phase lines of said commercial alternating current transmission system, and a coupling device and current limiting device in series therewith connected between each of the corresponding phase lines of said transmission system and said supply system, of a multiplicity of relays each including an electromagnet and contactor operated thereby, the electromagnets of said relays being interconnected with said phase lines of said supply system in a manner such as to cause the effective energization of the electromagnets of all of said relays when a short-circuit occurs in a coupling device of one of said phase lines, and means for supplying energy to said supply system for effecting the operation of a current limiting device connected in a phase line having a short-circuited coupling device, said means being rendered effective by the effective energization of the electromagnets of all of said relays.

5. A protective system in accordance with claim 4 including timing means for effecting the repetitious operation of said means during time intervals when the electromagnets of said multiplicity of relays are all effectively energized.

6. A protective system in accordance with claim 4 in which said means includes an alarm system rendered effective when the electromagnets of all of said relays are effectively energized.

7. A protective system comprising the combination with a multi-phase commercial alternating current transmission system including a number of different phase lines, a multi-phase carrier frequency energy supply system including a plurality of phase lines corresponding to the phase lines of said commercial alternating current transmission system, and a coupling device and current limiting device in series therewith connected between each of the corresponding phase lines of said transmission system and said supply system, of a group of relays each of which includes an operating electromagnet connected in one of the phase lines of said supply system, a separate relay having an operating electromagnet common to all of said phase lines of said supply system, all of said electromagnets being effectively energized when a short-circuit occurs in any one of said coupling devices, an electromagnetically operated contact for completing a direct circuit path from said transmission system to said supply system for supplying energy from said transmission system to said supply system, said contactor being controlled by a circuit completed through all of said relays in series when the electromagnets thereof are all energized, whereby energy is applied to a current limiting device for causing the operation thereof in a phase line having a short-circuited coupling device therein, a time controlled relay for repetitiously closing said last mentioned circuit when all of the electromagnets of said relays are effectively energized, and an alarm system controlled by said contactor.

ARTHUR M. TROGNER.